United States Patent
Otsuka et al.

(10) Patent No.: US 6,724,824 B2
(45) Date of Patent: Apr. 20, 2004

(54) DIGITAL SIGNAL PROCESSING METHOD

(75) Inventors: Takeshi Otsuka, Hyogo (JP);
Masatoshi Taniguchi, Osaka (JP);
Nobukatsu Okuda, Osaka (JP);
Hirofumi Uchida, Osaka (JP); Tatsushi Bannai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 651 days.

(21) Appl. No.: 09/748,876

(22) Filed: Dec. 27, 2000

(65) Prior Publication Data

US 2001/0016011 A1 Aug. 23, 2001

(30) Foreign Application Priority Data

Dec. 27, 1999  (JP) ............................................ 11-369839

(51) Int. Cl.$^7$ .............................. H04N 7/12; H04N 5/93; H04N 7/04

(52) U.S. Cl. ........................... 375/240.26; 375/240.01; 386/52; 386/108

(58) Field of Search ............................ 375/240, 240.01, 375/240.25, 240.26, 240.27; 386/52, 108; 705/57

(56) References Cited

U.S. PATENT DOCUMENTS

| | | | | |
|---|---|---|---|---|
| 5,960,148 A | * | 9/1999 | Miyazawa | 386/52 |
| 6,055,271 A | * | 4/2000 | Yasuda et al. | 375/240 |
| 6,339,676 B1 | * | 1/2002 | Amada et al. | 386/108 |
| 6,453,304 B1 | * | 9/2002 | Manabu et al. | 705/57 |

FOREIGN PATENT DOCUMENTS

JP            07226025         8/1995

* cited by examiner

*Primary Examiner*—Chris Kelley
*Assistant Examiner*—Allen Wong
(74) *Attorney, Agent, or Firm*—RatnerPrestia

(57) ABSTRACT

A digital signal processing method comprising the steps of:
(a) composing, a plurality of first encoded video data and a plurality of second encoded video data;
(b) dividing, each of high quality M bits audio channel into audio data of upper L bits and audio data of lower M-L bits;
(c) composing a plurality of first basic data and a plurality of second basic data, wherein each of the first basic data have respective audio data of upper "L" bits, and wherein the second basic data have respective audio data of audio data of lower "M-L"; and
(d) transmitting the first basic data in a first data bus, and the second basic data in a second data bus.

11 Claims, 16 Drawing Sheets

DIGITAL SIGNAL PROCESSING METHOD

FIELD OF THE INVENTION

The present invention relates to a digital signal processing method for transmitting digital encoded video data and digital audio data.

BACKGROUND OF THE INVENTION

In video data processors, recently, there is a rapid progress from analog to digital data, and further from non-encoded to encoded data reduced in bit rate. The professional video tape recorder (hereinafter called VTR), for example, has been evolved from analog recording system to such a digital VTR as D1, D2, D3 or D5 recording standard. Recording system of digital video signal has been further evolved from that of recording non bit rate reduced digital video signal to that of bit rate reduced one using high efficiency encoding technologies. Even in the consumer-use VTR, the analog system such as VHS has been evolved to such a recording system of high efficiency coding by Huffman code using discrete cosine transform (hereinafter called DCT) as DV-VTR system or D-VHS.

The conventional system has used the analog interface or serial digital interface (hereinafter called SDI) of non-encoded video data specified as SMPTE (Society of Motion Picture and Television Engineers) standard 259 M for video data transmission between studios for editing and/or broadcasting, between video systems.

However, in accordance with progress in digital apparatus as well as in high efficiency coding technology, it has been now the mainstream to transmit and receive encoded and bit rate reduced video data. In the consumer-use DV-VTRs, signals are exchanged by the interface of IEEE1394 standard among them. On the other hand, the professional VTR has used the serial digital transform interface (hereinafter called SDTI) standard for multiplexing plural channels of digital data encoded by bit rate reducing technology on the conventional SDI standard.

The SDTI standard is a system of multiplexing bit rate reduced data on the existing interface, and by increasing the bit rate to multiplex, it is easy to realize higher picture quality and faster transfer rate.

FIG. 7 is a schematic diagram of SDTI standard, showing the interface of SDTI standard of one video frame. FIG. 7a, FIG. 7b, and FIG. 7c correspond to images of 25, 50, and 100 mega bit per second (hereinafter called Mbps) modes, respectively, and bit rate reduced data of 25 Mbps, 50 Mbps, and 100 Mbps are transmitted on the interface of the SDTI standard.

In this case, each of the basic encoded and bit rate reduced digital data (hereinafter called basic data) of the professional VTR has the 25 Mbps bit reduced digital video data and 2-channel 16-bit digital audio data multiplexed thereon, for explanation.

Hereinafter, the data rate of video image are 25 Mbps, 50 Mbps, and 100 Mbps are called 25 Mbps mode, 50 Mbps mode and 100 Mbps mode, respectively.

The 25 Mbps mode of FIG. 7a, the 50 Mbps mode of FIG. 7b, and the 100 Mbps mode of FIG. 7c carry one basic data 1 in one video frame, two basic data 1 and 2 in one frame, and four basic data 1, 2, 3 and 4 in one frame respectively.

Thus, in order to improve the picture quality, the bit rate of basic data is to be increased on the interface of the SDTI standard, and bit rate of 100 Mbps is able to transmit and receive three types of encoded bit rate reduced digital data having 25 Mbps, 50 Mbps, and 100 Mbps.

Similarly, the 25 Mbps mode can transmit one set of 25 Mbps bit reduced data, and also the 50 Mbps mode can transmit, for example, two separate video data having bit rate of 25 Mbps.

Additionally, in the audio data processing, the digital audio data will be sophisticatedly multiplexed and then transmitted on the bit rate reduced video data in such multiple channel modes as 2 channels, 4 channels and 8 channels, and/or in such hierarchical sound qualities as 16 bits, 24 bits and 32 bits.

As one basic data has conventionally 2 channels audio data of 16 bits, the interface of the SDTI standard can transmit such multiple channel audio data as 2 channels digital audio data of 16 bits in the 25 Mbps mode of FIG. 7a, 4 channels audio data of 16 bits in the 50 Mbps mode of FIG. 7b, and 8 channels audio data of 16 bits in the 50 Mbps mode of FIG. 7c.

The conventional SDTI standard can transmit the increased number of digital audio channels by the enhancement of transmission bit rate, but any technique has not yet been developed for improving the sound quality by using the audio data having more than 16 bits in transmission.

SUMMARY

It is hence an object of the invention to present a processing method of digital signal for multiplexing audio data together with encoded and bit rate reduced video data in a specific fixed bit rate of one basic data, and transmitting and receiving it through a data bus, while keeping compatibility with the conventional data, and in a state applicable not only to multiple channels audio data but also to high quality audio data. It is another object of the invention to present a processing method of digital signal capable of transmitting and receiving audio data and video data hierarchically while keeping compatibility with the conventional data.

To achieve these objects, the digital signal processing method of the invention comprises the following steps.

(a) From digital video data, a plurality of first encoded video data and a plurality of second encoded video data, wherein a number of the first encoded video data is "N" ("N" being a natural number), and the second encoded video data is "N";

(b) In audio data, each of N×K channels ("K" being a natural number) of high quality quantized by M bits ("M" being a natural number) into audio data of upper L ("L" being a natural number) bits from most significant bit and audio data of lower M-L bits from least significant bit, wherein "L" is a quantized bits of standard audio data, and "M" is larger than "L" and no larger than twice of "L" (that is, L<M≦2×L).

(c) A plurality of first basic data and a plurality of second basic data are composed,, wherein number of the first basic data is "N", and the first basic data have respective K channels audio data of upper L bits multiplexed together with each of the first encoded video data, and wherein number of the second basic data is "N", and the second basic data have respective "K" channels audio data of audio data of lower M-L bits multiplexed together with each of the second encoded video data.

(d) The first basic data are transmitted in a first data bus.

(e) The second basic data are transmitted-in a second data bus.

DESCRIPTION OF THE PREFERRED EMBODIMENTS

Preferred embodiments of the invention are described below while referring to the accompanying drawings.
(Embodiment 1)

FIG. 1 relates to a first embodiment of the invention, showing a first data bus, a second data bus, and a format of basic data 1 and basic data 2 transmitted in the first data bus, and a format of basic data 3 and basic data 4 transmitted in the second data bus. Each basic data is transmitted at a bit rate of about 25 mega-bits per second (hereinafter called Mbps), and so four(4) basic data blocks (2×N=4, N is a number of blocks of basic data in one data bus and is natural number) are transmitted at a bit rate of 100 Mbps in total. The basic data 1, 2, 3 or 4 is composed of an encoded video data and two channels audio data (K=2 channels, K is a number of audio signal channels in basic data and is natural number) Ch1 and Ch2, Ch3 and Ch4, Ch5 and Ch6, or Ch7 and Ch8 respectively. The audio data in each channel can handle quantified data of 16 bits (L bits, L is a bits number of an audio channel as well as of standard audio and is a natural number) at maximum.

The first data bus and second data bus may be either logical buses or hardware buses. Hereinafter, they are expressed merely as first data bus and second data bus.

Figure 1A:
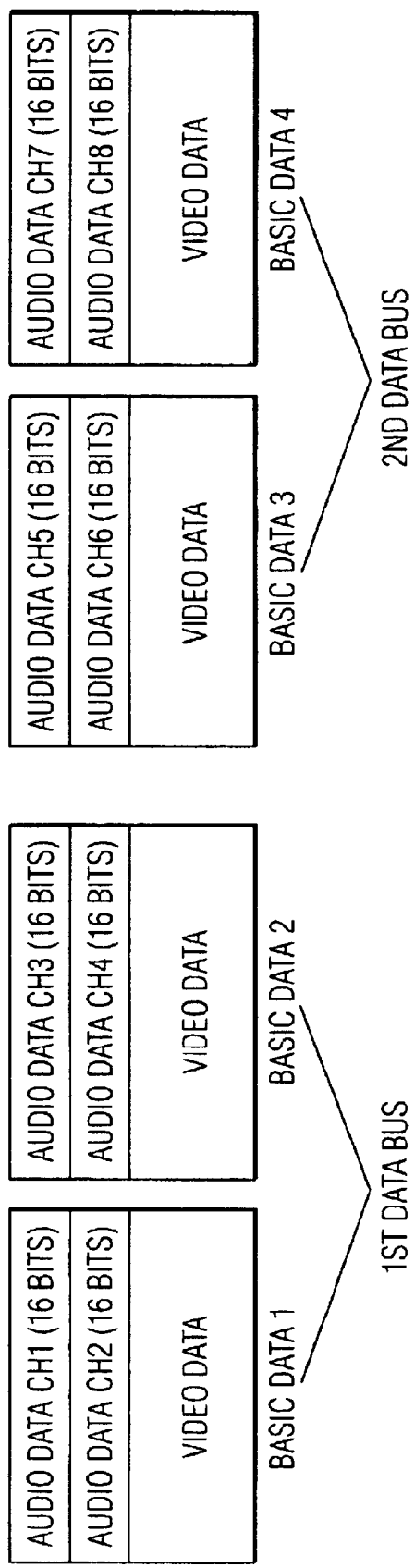
FIGS. 1a and 1b show a transmission mode of video data, multi-channel standard audio, and high quality audio in an embodiment of the invention.

FIG. 1a shows a case of multi-channel (in this case, 8 channels) standard audio mode, in which eight channels audio data Ch1, Ch2, Ch3, Ch4, Ch5, Ch6, Ch7, and Ch8 transmitted and received are 16-bits standard audio data.

Figure 1B:
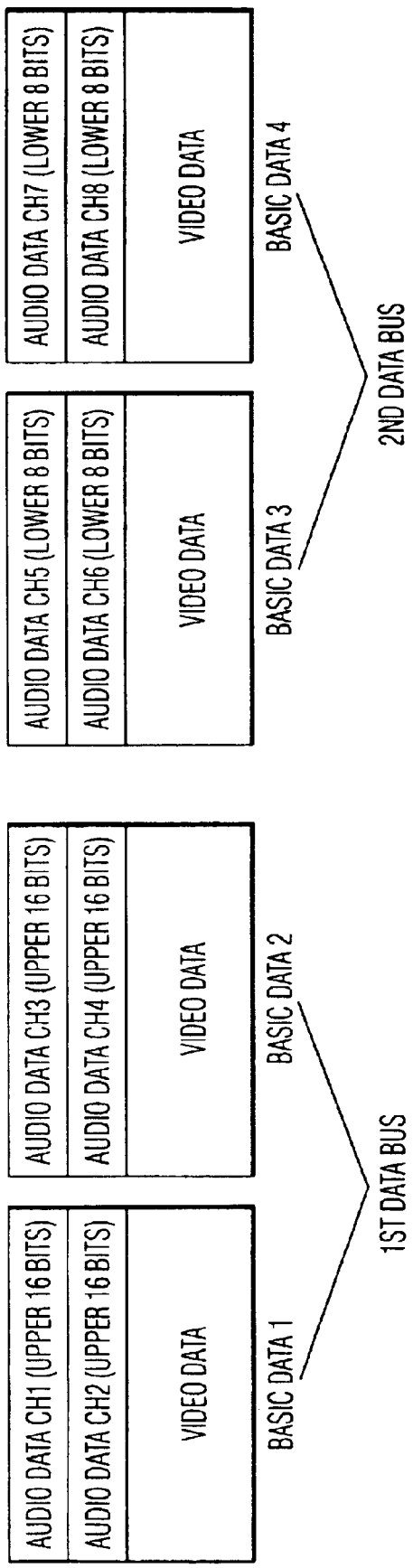

FIG. 1b shows a 24 bits (M bits, M is a bit number of a high quality audio and is a natural number) high quality audio mode (in this case, 4 channels), in which each of four channels audio data of first data bus Ch1, Ch2, Ch3, and Ch4 processes upper 16 bits (L bits) from most significant bit (hereinafter called MSB) of the 24 (M) bits, and each of four channels audio signal of second data bus Ch5, Ch6, Ch7, and Ch8 processes corresponding lower 8 bits from least significant bit (hereinafter called LSB) of the 24 bits and 8 bits of dummy data. The first data bus and second data bus transmit and receive 4 channels high quality audio data of 24 bits (M bits) in an audio data structure Ch1+Ch5, Ch2+Ch6, Ch3+Ch7, and Ch4+Ch8.

Figure 8:
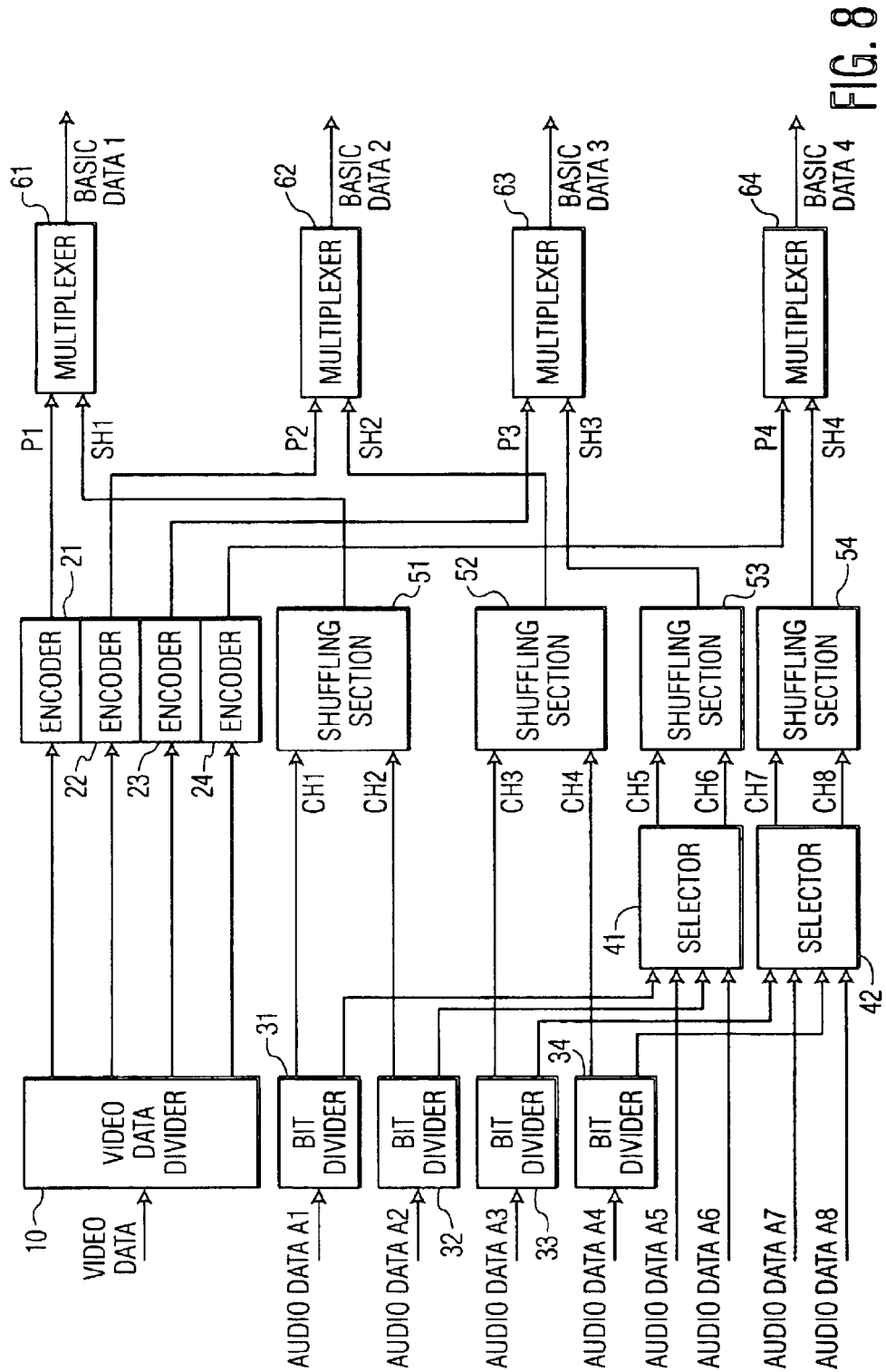
FIG. 8 is a detailed block diagram of an embodiment of the invention.

FIG. 8 is a block diagram showing an example of digital signal processing circuit according to a first embodiment of the invention. As shown in FIG. 8, video data dividing means (hereinafter called video data divider) 10 divides input video data into four video signals in each picture, in other words each video frame. Encoders 21, 22, 23, and 24 reduce these four video signals in bit rate, and produce bit reduced video data P1, P2, P3, and P4.

Bit dividers 31, 32, 33, and 34 divide 24 bits high quality audio signals of audio input A1, A2, A3, and A4 into upper 16 bits from MSB and lower 8 bits from LSB, respectively. Selector 41 selects either one of output 8 bits of bit dividers 31 and 32, or 16 bits standard audio data A5 and A6, and produces audio data Ch5 and Ch6. Similarly, selector 42 selects either one of output 8 bits of bit dividers 33 and 34, or 16 bits standard audio data A7 and A8, and produces audio data Ch7 and Ch8. Shuffling section 51 individually shuffles two audio data Ch1 and Ch2 from bit divider 31 and 32, and produces a shuffled audio signal Sh1. Shuffling section 52 individually shuffles 16 bits audio data Ch3 and Ch4 from bit dividers 33 and 34, and produces a shuffled audio signal Sh2. Shuffling section 53 individually shuffles audio data Ch5 and Ch6 from selector 41, each of which is 8 bits or 16 bits, and produces a shuffled audio signal Sh3. Shuffling section 54 individually shuffles audio data Ch7 and Ch8 from selector 42, each of which is 8 bits or 16 bits, and produces a shuffled audio signal Sh4.

Multiplexer 61, 62, 63, and 64 multiplex video data P1, P2, P3, and P4, and shuffled audio signals Sh1, Sh2, Sh3, and Sh4, respectively, by means of time divisional multiplexing method, so as to produce the basic data 1, 2, 3, and 4.

Explained next is a specific example of encoding high definition (hereinafter called HD) video data having about 660 Mbps bit rate to a bit reduced video data which has about 1/6.6 bit rate, that is 100 Mbps, and transmitting by multiplexing it together with 8 channels 16 bits audio signals, or with 4 channels 24 bits audio signals. HD video data of about 660 Mbps, for example, has effective 1080 lines/screen (every 30 Hz) vertically and has 1280 samples (2560 words together with luminance signal and color difference signal) in one horizontal line.

First, the video data divider 10 divides one screen having effective vertical 1080 lines/screen (every 30 Hz) into four blocks in every 270 horizontal lines, and then sends the four divided data out to encoders 21, 22, 23, and 24, respectively. The video data divider 10 is composed of four memories and their control circuit, and is designed to store the four video data of every 270 horizontal lines into the four memories. These four video data are then read out in parallel from the corresponding memories.

Further, the encoders 21, 22, 23, and 24 reduce bit rates of the divided video data to about 1/6.6 of input by means of high efficiency coding such as discrete cosine transform (hereinafter DCT) and Huffman coding, and then send encoded video data P1, P2, P3, and P4 out to multiplexer 61, 62, 63, and 64, respectively.

Regarding to audio signal, when the high quality audio mode is selected, the bit divides 31 and 32 divide 24 bits high quality audio signals A1 and A2 into their upper 16 bits from MSB and their lower 8 bits from LSB, and send the upper 16 bits out to the shuffling section 51 and send the lower 8 bits out to the selector 41. The selector 41 arranges the data of the lower 8 bits in the upper 8 bits data position of the audio 16 bits (L bits), and arranges dummy data of 8 bits, for example, "00000000" in a vacant lower 8 bits position of the audio 16 bits, so as to produce a temporary 16 bits signal. Similarly, the bit dividers 33 and 34 divide 24 bits high quality audio inputs A3 and A4 into their upper 16 bits from MSB and their lower 8 bits from LSB, respectively, and send the upper 16 bits out to the shuffling section 52, and send the lower 8 bits out to the selector 42. The selector 42 arranges the data of the lower 8 bits in the upper 8 bits data position of the audio 16 bits (L bits), and arranges dummy data of 8 bits, for example, "00000000" in a vacant position of lower 8 bits data position of audio 16 bits, so as to produce another temporary 16-bits signal. The selector 41 selects either the lower 8 bits audio data from the bit dividers 31 and 32, or the 16 bits audio inputs A5 and A6, according to the audio mode. The selector 42 selects either the lower 8 bits audio data from the bit dividers 33 and 34, or the 16 bits audio inputs A7 and A8, according to the audio mode.

When the multi-channel standard audio mode is selected, the selector 41 selects 16 bits audio inputs A5 and A6, and the selector 42 selects 16 bits audio inputs A7 and A8. Herein, in the circuit shown in FIG. 8, the basic data 1 and 2 in the first data bus, for example, always process audio data of upper 16 bits of high quality from the bit dividers 31, 32, 33, and 34, and the basic data 3 and 4 in the second data bus, for example, always process the upper 16 bits. Thus, when multiplexing the encoded video data reduced in bit rate at a fixed rate together with audio data by means of time divisional multiplexing method, by defining the basic data which process the lower bits of audio signal together with digital video data, the basic data can be applicable to both multi-channels standard audio mode and high quality audio mode for transmission and reception.

In this manner, when the audio data transmitted in high quality mode is received in the multi-channels standard audio mode, by decoding only the audio data of the first data bus, such receiver is able to accept the high quality audio data as a multi-channels standard audio data. Therefore, the compatibility between high quality mode and multi-channels standard audio mode can be established.

Moreover, in the case of high quality audio mode, by inserting dummy data in the video data of the second data bus and by composing the second bus data with the dummy video data together with the lower bits of audio data, "N" ("N" is number of blocks of basic data in a data bus and is a natural number) blocks of the video data and an even number (2×N) of the audio data can be transmitted and received, in the system of the invention.

As explained in this embodiment of the invention, the block number "N" of basic data in the data bus is 2 (N=2), the quantizing bits of high quality audio is 24 bits (M=24 bits), the quantizing bits of standard audio is 16 bits (L=16 bits), and the number of audio channels in the basic data is 2 channels (K=2), but in this embodiment and other embodiments given below, these values ("N", "M", "L", and "K") are not limited to the given numbers only. However, the number of quantizing bits of high quality audio of "M" should be larger than the number of quantizing bits of standard audio "L", and should not be more than twice the number of quantizing bits of standard audio 2×L (L<M≦2×L).

The configuration of digital signal processing circuit for realizing the signal processing method of the invention is not limited to the illustrated in this embodiment as well as in other embodiments.

(Embodiment 2)

Figure 2:
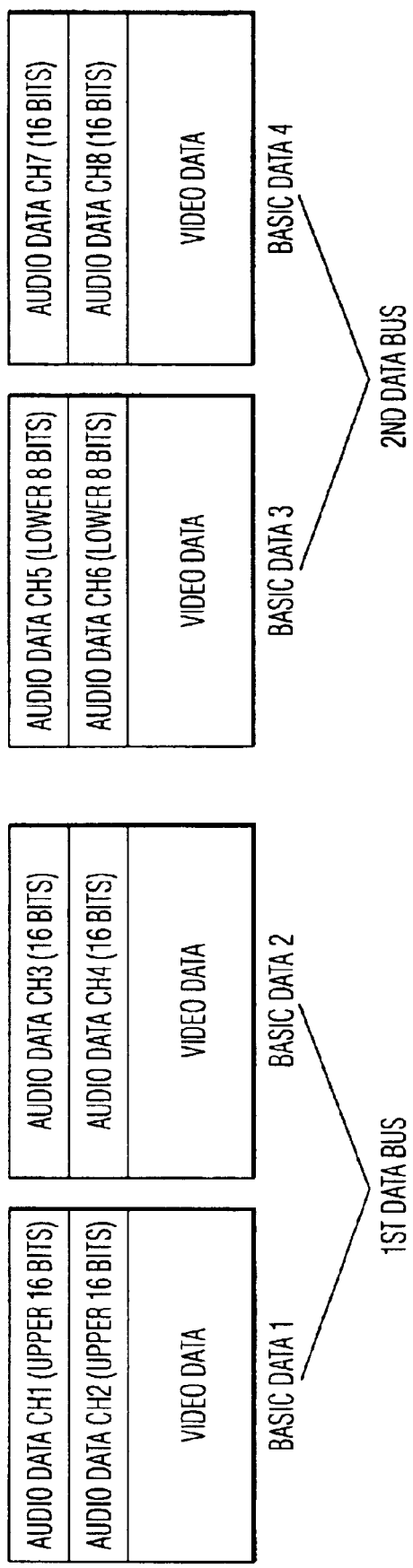
FIG. 2 shows a transmission state of audio mixed mode in another embodiment of the invention.

FIG. 2 shows a second embodiment of digital signal processing method of the invention, relating to a case of mixed audio mode. This processes four blocks of 16 bits standard audio data Ch3, Ch4, Ch7, and Ch8, and two blocks of high quality audio data (Ch1+Ch5) and (Ch2+Ch6). Herein, the video data is transmitted same as in FIG. 1a or FIG. 1b.

Each one of four blocks of (in this embodiment, N=2 and hence 2×N=4) basic data 1, 2, 3, and 4 multiplexes encoded video data to a fixed rate together with audio data of 2 channels (K=2) having standard bits ("L" bits) by means of time divisional multiplexing method. The first data bus transmits two blocks (N=2) of basic data 1 and 2. The second data bus transmits two blocks (N=2) of other basic data 3 and 4. Each one of standard audio data Ch3, Ch4, Ch7, and Ch8 is composed of audio data of standard bits of 16 bits (L=16). The high quality audio channel is composed of high quality bits of 24 bits (M=24) of high quality audio signal.

Each one of audio data Ch1 and Ch2 of the basic data 1 belonging to the first data bus is composed of audio data of upper 16 bits (upper L bits) from MSB of 24 bits (M bits) high quality audio data, and each one of audio data Ch3 and Ch4 belonging to the remaining basic data is composed of 16 bits (L bits) standard audio data.

Each one of audio data Ch5 and Ch6 of the basic data 3 belonging to the second data bus is composed of audio data of lower 8 bits (M-L bits) excluding the portion of upper 16 bits (L bits) of the high quality audio bits of 24 (M) bits, in other words, audio data of lower 8 bits from LSB of the high quality audio bits of 24 (M) bits and each one of the remaining audio data Ch7 and Ch8 of basic data 4 is composed of 16 bits (L bits) standard audio data.

By setting such audio signal mixed mode, it is usually possible to transmit 2 channels of 24 bits high quality audio signal by using four channels of 16 bits standard audio channel.

The signal processing method of the second embodiment shown in FIG. 8 can be realized in a similar way to the foregoing first embodiment.

Herein, the selectors 41 and 42 operate separately.

When the audio signal mixed mode is set, the selector 41 selects the two outputs of the bit divider 31 and 32, that is, the audio data of lower 8 bits of 24 bits high quality audio signals A1 and A2, and sends audio data Ch5 and Ch6 to the shuffling section 53.

On the other hand, the selector 42 does not select the output of the bit dividers 33 and 34, but selects the 16 bits standard audio signals A7 and A8, and sends audio data Ch7 and Ch8 to the shuffling section 54. As the other parts operate similarly to the first embodiment, the explanation is omitted here.

In this case, a receiver designed for decoding 4 channels (multi-channels mode) standard audio data is able to receive 4 channels mixed mode audio data which is composed of 2 channels 16 bits standard audio data and 2 channels 24 bits high quality audio data, so as to decode such 4 channels as, 4 channels 16 bits standard audio data transmitted in only the first data bus. Therefore, the mixed mode data of the transmission side can keep compatibility with the multi-channels mode at the reception side.

(Embodiment 3)

Figure 3:
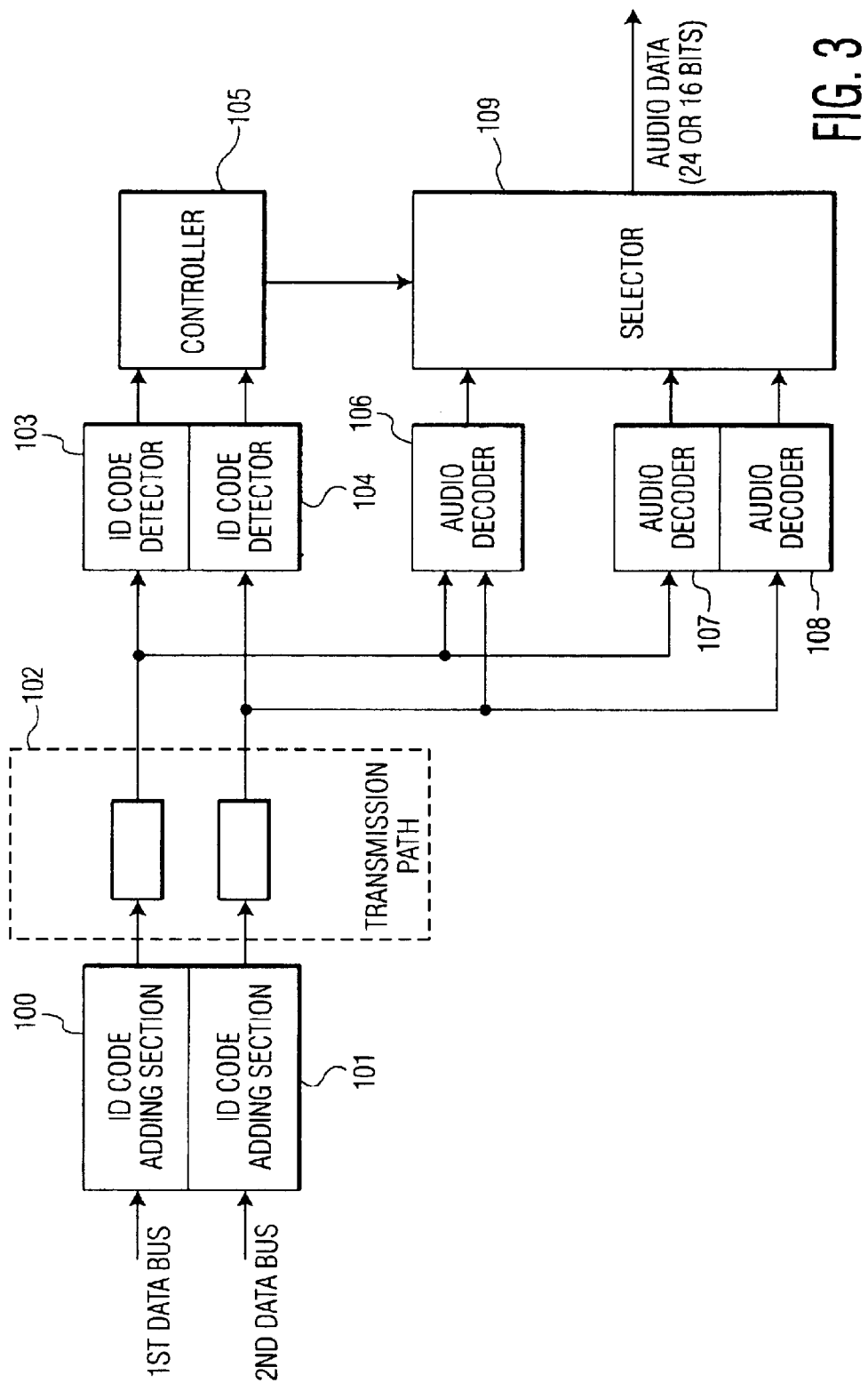
FIG. 3 is a block diagram of an embodiment of the invention.

FIG. 3 is a block diagram of a further embodiment of the invention. In FIG. 3, at the transmission side, first identification (hereinafter called ID) code adding section 100 adds a first ID code to the basic data of the first data bus. Second ID code adding section 101 adds a second ID code to the basic data of the second data bus. The data issued from the first ID code adding section and the second ID code adding section are transmitted to the reception side through a transmission path 102.

At the reception side, a first ID code detector 103 detects the first ID code added to the basic data of the first data bus of the transmission path 102. A second ID code detector 104 detects the second ID added to the basic data of the second data bus of the transmission path 102.

An audio decoder 106 decodes audio signal from the first data bus in combination with that from second data bus so as to reproduce one 24 bits audio signal transmitted. Further, 16 bits audio decoders 107 and 108 decode the audio data of the first data bus and second data bus, individually so as to reproduce 16 bits audio signals.

A controller 105 controls a selector 109 so as to put out 24 bits audio data from audio decoder 106 or 16 bits audio data from audio decoders 107 and 108, in response to the first ID code and/or second ID code detected.

In the digital signal processor of FIG. 3, the operation is described below by referring to an example of processing 2 channels 16 bits digital audio data only in one basic data, in the transmission bus for transmitting digital audio data of 4 channels and 24 bits. To begin with, the first ID code adding section 100 adds a first ID code for identifying whether lower "M-L" bits of audio data corresponding to upper L bits in the first bus is transmitted simultaneously in the second data bus or not. The second ID code adding section 101 adds a second ID code for identifying whether higher L bits audio data corresponding to the lower M-L bits of audio data in the second bus is transmitted simultaneously in the first data bus or not. Each of the first and the second ID codes is added to respective one among time sequential samples of audio signal of the first and second data busses, respectively. For example, these ID codes are added to the last sample among time sequential samples in respective audio signals.

FIG. 9 is a diagram showing the state of first and second ID codes. In the diagram, the left side indicates the first ID codes added to the first data bus, and the right side indicates the second ID codes added to the second data bus. The left side of the first ID code belongs to basic data 1, and the right side of the first ID code belongs to basic data 2. The left side of the second ID code belongs to the basic data 3, and the right side of the second ID code belongs to the basic data bus 4. As shown in the diagram, since each basic data has 2 channels audio data, and hence four first ID codes are added to the first data bus, and four second ID codes are added to the second data bus. In FIG. 9, four audio data CH1, CH2, CH3 and CH4 are arranged in the first data bus, and four audio data CH5, CH6, CH7 and CH8 are arranged in the second data bus.

Figure 9A:
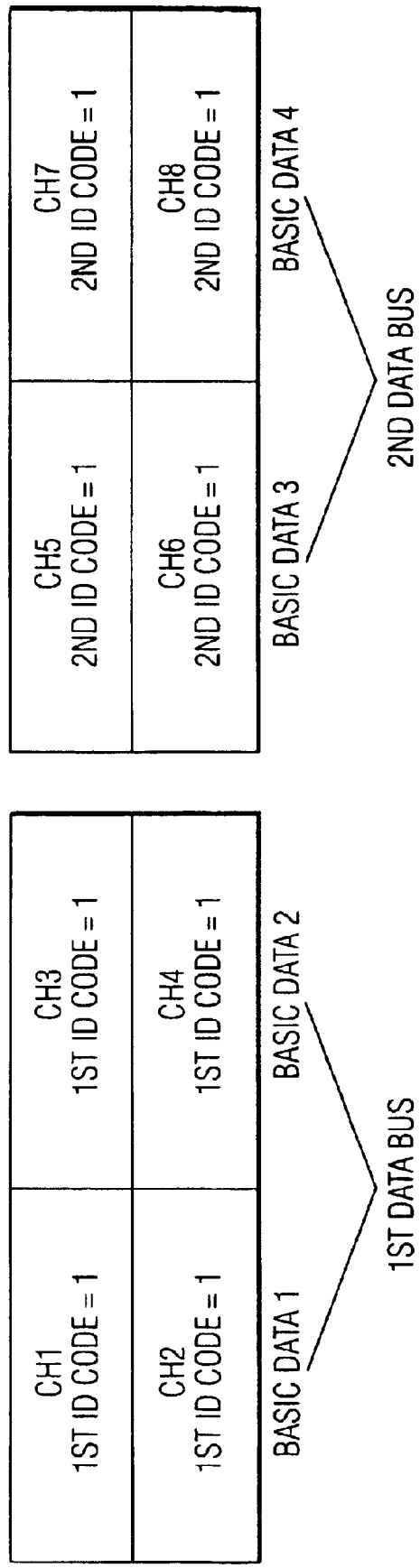
FIGS. 9a, 9b and 9c are diagrams for explaining an identification (hereinafter called ID) code in the embodiment of FIG. 3.

FIG. 9 shows the state of ID codes arranged by the first and second ID code adding section 100 and 101 at the transmission side in FIG. 3. The first ID code is logical "1" (hereinafter called "1") when there is possibility of the second data bus transmitting simultaneously lower M-L bits corresponding to high quality audio signal of the first data bus, and it is logical "0" (hereinafter called "0") when there is no possibility of the second bus transmitting the lower M-L bits. Similarly, the second discrimination code is "1" when there is possibility of the first data bus transmitting simultaneously upper L bits corresponding to the lower M-L bits of the audio signal, and it is "0" when there is no possibility of the first bus transmitting corresponding upper L bits FIG. 9a shows that all of the first and second ID codes are "1", and that the state of the first data bus and second data bus transmitting high quality audio signals of 4 channels and 24 bits by using audio data of 8 channels Ch1, Ch2, Ch3 and Ch4, and Ch5, Ch6, Ch7 and Ch8.

Figure 9B:
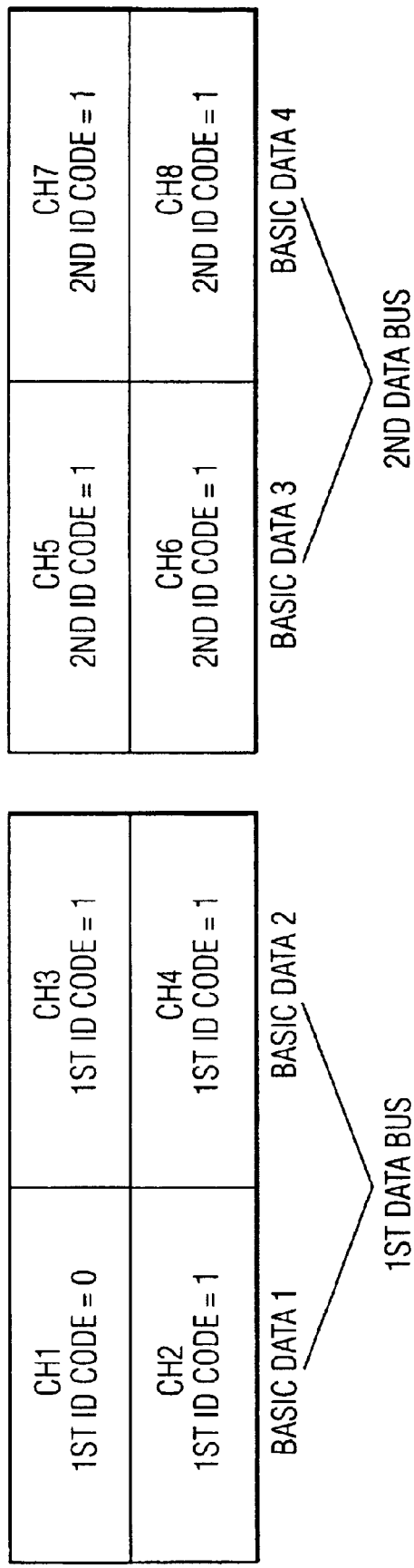

FIG. 9b shows a case of upper 16 bits of 24 bits high quality audio signal arranged only in audio data Ch1. In this case, since the audio data Ch1 is already handling upper 16 bits of high quality audio signal, the first ID code adding section 100 judges that there is no lower M-L bits in the second data bus, and shows the state of setting the first ID code in "0".

Figure 9C:
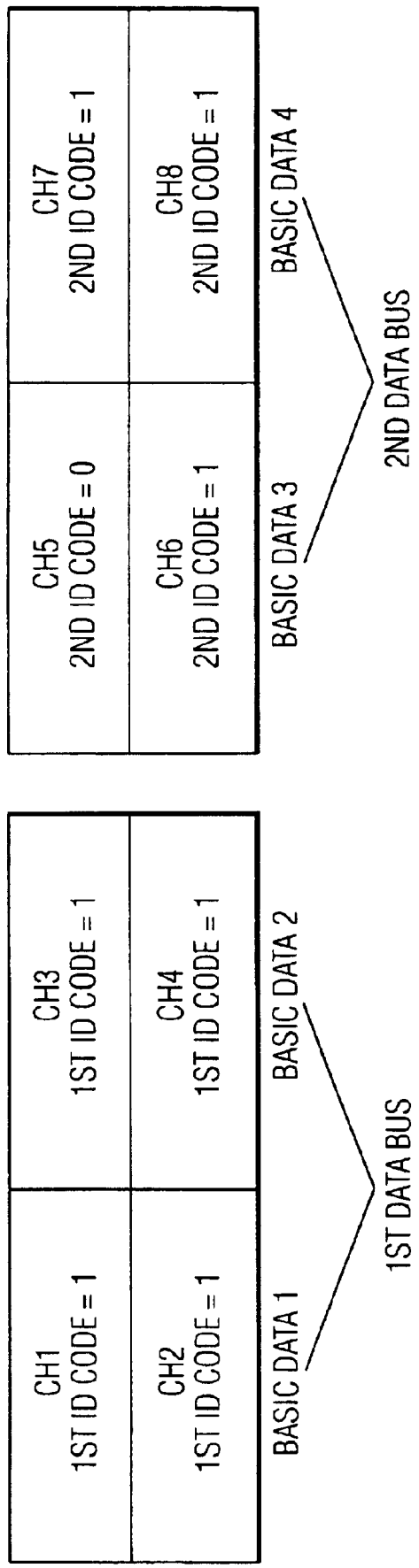

FIG. 9c shows a state of arranging 16 bits standard audio signal to the audio data Ch5 in which the lower 8 bits may be disposed. Since the 16 bits audio signal exists in the audio data Ch5, the second ID code adding section 102 judges that the lower bits dose not exist in the audio data Ch5, and sets the second ID code of the audio data Ch5 in "0". The first ID code and second ID code are, for example, added to the respective last one of audio sequential samples.

When the audio data in the state of FIG. 9a are received at the reception side, the controller 105 judges that 24 bits high quality audio signal has been transmitted in 4 channels, because all of the first ID codes of audio data Ch1, Ch2, Ch3 and Ch4 of the first data bus are "1", and all of the second ID codes of audio data Ch5, Ch6, C7h, and Ch8 of the second data bus are "1". Then the selector 107 selects the 24 (M) bits audio signal from the 24 bits audio signal decoder 106.

In the case when the audio data in the state in FIG. 9b are received at the reception side, the first ID code of audio data Ch1 is "0" which indicates possibly no lower 8 (M-L) bits existing in the audio channel Ch5 and the second ID code of audio data Ch5 is "1" which indicates possibly a upper 16 (L) bits existing in the audio channel Ch1. In this case, the ID code "0" of the audio channel Ch1 contradicts to the ID code "1" of the audio channel Ch5. In this case, the controller 105 invalidates the lower 8 (M-L) bits of the audio data Ch5, and judges that the 16 (L) bits standard audio signal has been transmitted. As a result, the selector 109 selects the 16 (L) bits audio signal of audio data Ch1 from the 16 bits audio decoder 107.

When the audio signals in the state in FIG. 9c are received at the reception side, the first ID code of audio data Ch1 is "1" which indicates possibly of a lower 8 (M-L) bits existing in the audio channel Ch5, and the second ID code of audio data Ch5 is "0" which indicates possibly no upper 16 (L) bits existing in the audio channel Ch1. In this case, the ID code "1" of the audio channel Ch1 contradicts to the ID code "0" of the audio channel Ch5. Then, the controller 105 also invalidates the lower 8 (M-L) bits of audio data Ch5, and judges that the 16 bits standard audio signal has been transmitted. As a result, the selector 109 selects the 16 bits standard audio signal of audio data Ch1 from the 16 bits audio decoder 107.

Thus, since the first and second ID codes are added and transmitted, the system shown in FIGS. 3 and 9 decode securely the audio signals at the reception side regardless of audio quantized bits, in other words a 24 (M) bits high quality or a 16 (L) bits standard audio signals.

In the explanation above, the values of the first and the second ID codes are "0" and "1", but not limited to them. The ID codes can be any values as far as they can identify whether the lower M-L bits of M bits high quality audio signal exist in the audio data of the second data bus or not.

Although, the first and the second ID codes of audio data Ch1 and Ch5 is explained in FIG. 9b and FIG. 9c, these process can be applied to the first and the second ID codes of other audio data Ch2 and Ch6, Ch3 and Ch7, as well as Ch4 and Ch8.

(Embodiment 4)

In a further different embodiment of the invention, if the basic data of the second data bus includes lower M-L bits of M bits audio signal transmitted in the first data bus, this state is distinguished by adding a position code showing the position of a basic data in the first data bus that the upper L bits of the corresponding M bits high quality audio signal exists. This position code is added to one of plural sequential samples of the audio data.

In FIG. 3, the second ID code adding section 101 also adds a position code when there is lower M-L bits of high quality audio data in the input audio signal of the first data bus.

FIG. 10 explains the position code, showing the state of audio data when 2 channels 24 bits high quality audio signal is inserted in part of the 16 bits audio data region of 8 channels. When the basic data 1 of the first data bus contains the audio data of corresponding upper L bits, the position code of the second data bus is set "1", for example, and when the basic data 2 contains the audio data of the corresponding upper L bits, the position code of the second data bus is set "0".

The left half of FIG. 10 shows the bit number of audio data Ch1, Ch2, Ch3, and Ch4 transmitted in the basic data 1 and 2 of the first data bus, and the right half shows the bit number of audio data Ch5, Ch6, Ch7, and Ch8 transmitted in the basic data 3 and 4 of the second data bus. The left side of the first data bus shows audio data Ch1 and Ch2 of the basic data 1, and the right side shows audio data Ch3 and Ch4 of the basic data 2. The left side of the second data bus shows audio data Ch5 and Ch6 of the basic data 3, and the right side shows audio data Ch7 and Ch8 of the basic data 4.

Figure 10A:
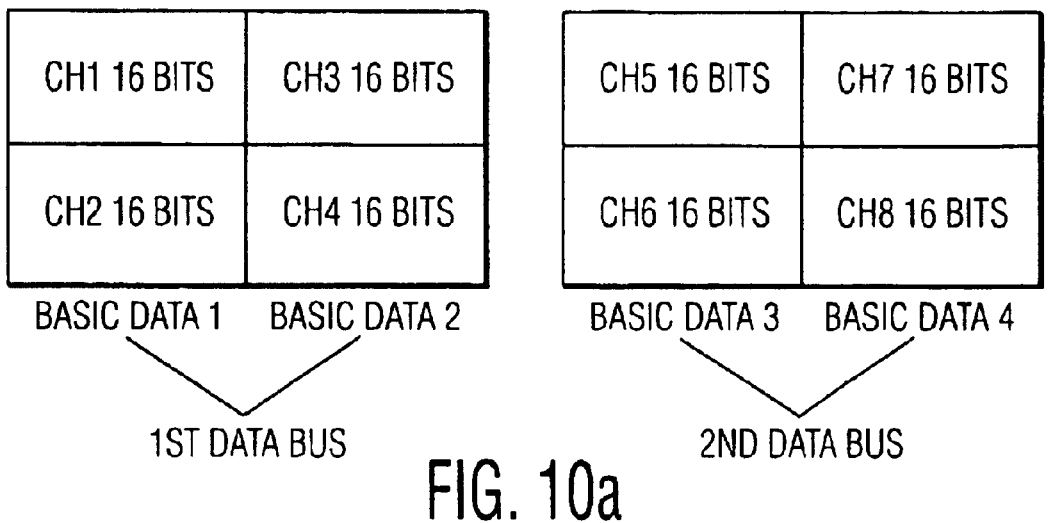
FIGS. 10a, 10b and 10c are diagrams for explaining a position code in a embodiment of the invention.

FIG. 10a shows a case in which each of audio data Ch1 to Ch8 is 16 bits standard audio.

Figure 10B:
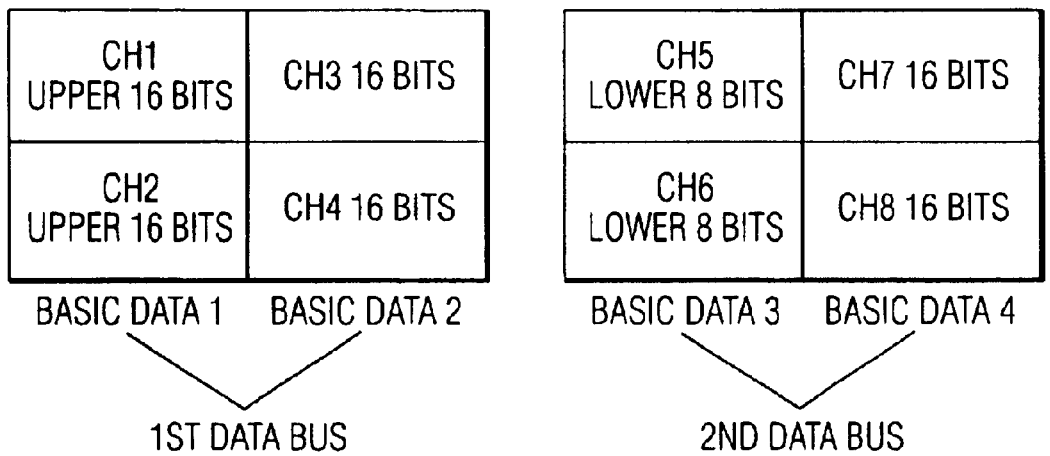

In FIG. 10b, audio data Ch1 and Ch2 process upper 16 (L) bits of 24 (M) bits high quality audio signal, and audio data Ch5 and Ch6 process lower 8 (M-L) bits corresponding to the audio data Ch1 and Ch2, respectively.

Figure 10C:
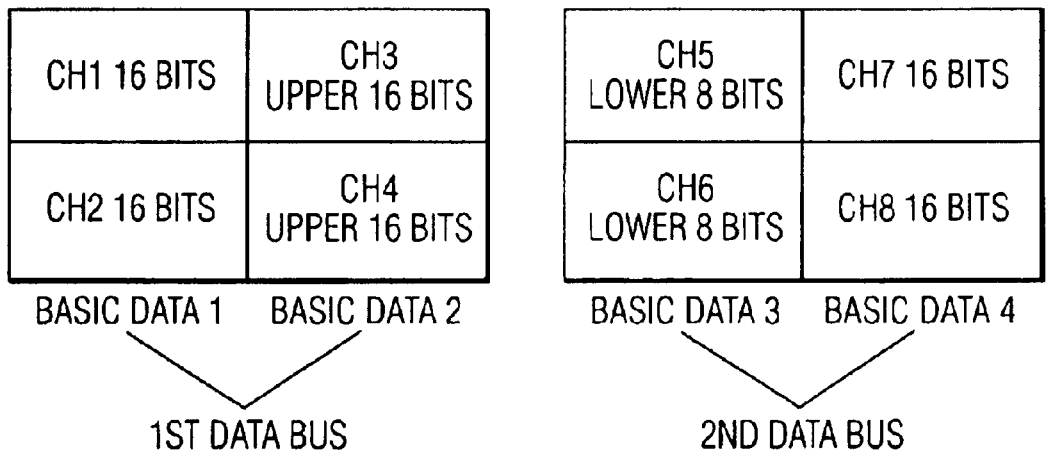

In FIG. 10c, audio data Ch3 and Ch4 process upper 16 (a) bits of 24 (M) bits high quality audio signal, and audio data Ch5 and Ch6 process lower 8 (M-L) bits corresponding to the audio data Ch3 and Ch4, respectively.

In the case, as shown in FIG. 10b, when the position codes of audio data Ch5 and Ch6 of the lower bits of the basic data 3 in the second data bus are "1", the audio data Ch1 and Ch2 of the basic data 1 in the first bus are the higher bits corresponding thereto, respectively. When receiving such position code, the selector 109 generates such two channels 24 bits high quality audio data as decoded data of Ch1+Ch5 and decoded data of Ch2+Ch6, by selecting audio signal from the 24 bits decoder 106.

Regarding FIG. 10c, when the position codes of audio data Ch 5 and Ch 6 of the lower of the basic data 3 in the second data bus are "0", the audio data Ch3 and Ch4 of the basic data 2 in the first data bus are the higher bits corresponding thereto, respectively. When receiving such position code, the selector 109 generates such two channels 24 bits high quality audio data as decoded data of Ch3+Ch5 and decoded data of Ch4+Ch 6, by selecting audio signal from the 24 bits decoder 106.

In this way, when the audio data of the basic data of the second data bus is 8 bits, by adding the position, the 16 (L) bits standard audio data and 24 (M) bits high quality audio data are transmitted in mixture, they can be decoded separately at the reception side.

This embodiment is particularly effective when a recorder overwrites and records 24 (M) bits high quality audio data to a recorded medium on which a 16 (L) bits standard audio data has already been recorded. When 2 channels 24 (M) bits high quality audio data are overwritten and recorded on the recorded medium on which such eight channels 16 (L) bits standard audio data Ch1 and Ch5, Ch2 and Ch6, Ch3 and Ch7, and Ch4 and Ch8 have already been recorded as shown in FIG. 10a, are recorded, the 2 channels 24 (M) bits high quality audio data are overwritten and recorded on the recorded medium as shown in FIG. 10b or 10c. As a result, in the case of FIG. 10b, 4 channels 16 bits standard audio data Ch3, Ch4, Ch7, and Ch8 are not overwritten, while such 2 channel blocks of the audio data channel as Ch1+Ch5 and Ch2+Ch6 are overwritten by 2 channels 24 (M) bits high quality audio data. In the case of FIG. 10c, similary, 4 channels of the 16 (L) bits standard audio data of Ch1, Ch2, Ch7, and Ch8 are not overwritten, while such 2 channel blocks of the audio data channel as Ch3+Ch5 and Ch4+Ch6 are overwritten by 2 channels 24 (M) bits high quality audio data. In this embodiment, the values of position code are "0" and "1", but not limited to them, any values can be used as far as they can be distinguished in the first and second data buses.

(Embodiment 5)

Figure 4:
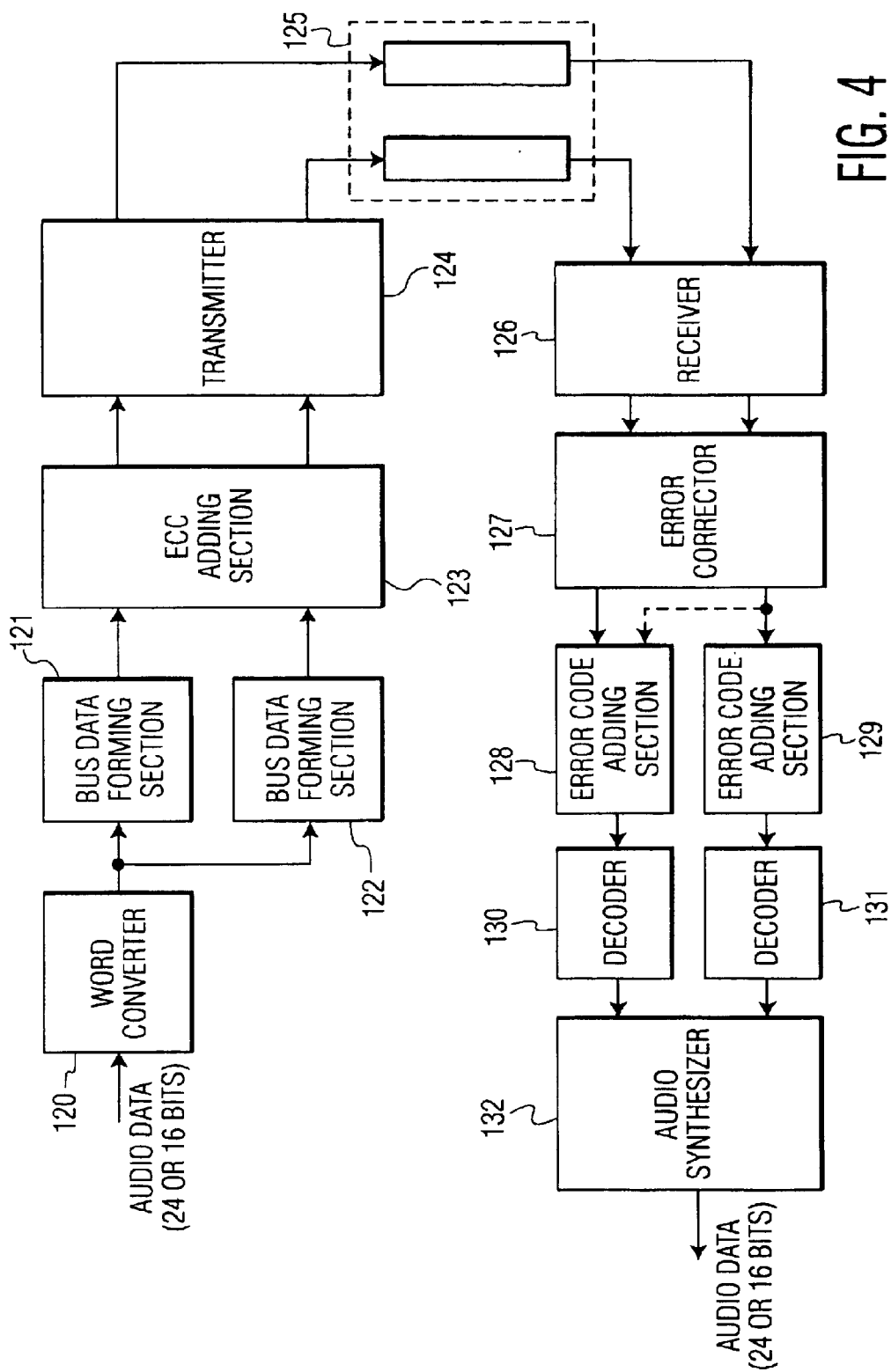
FIG. 4 is a block diagram of another embodiment of the invention.

FIG. 4 is a block diagram of a digital signal processor in other embodiment of the invention, mainly relating to processing of audio signals. Herein, the operation is explained in the case of encoding 16 (L) bits standard audio signal and 24 (M) bits high quality audio signal with error correcting code (hereinafter ECC) to identify error during the transmission, and correcting the error at the reception side. In FIG. 4, first, at the transmission side, word converter 120 converts 16 (L) bits or 24 (M) bits audio signal into a specified code. When the input audio signal is to be distributed to the first data bus, this word converter 120 sends the converted code to first bus data forming section 121. When the input audio signal is to be distributed to the second data bus, this word converter 120 sends the converted code to second bus data forming section 122.

Herein, the specific operation of the word converter 120 is explained by referring to FIG. 11. FIG. 11 shows code assignment of audio data and inhibiting words.

Figure 11B:
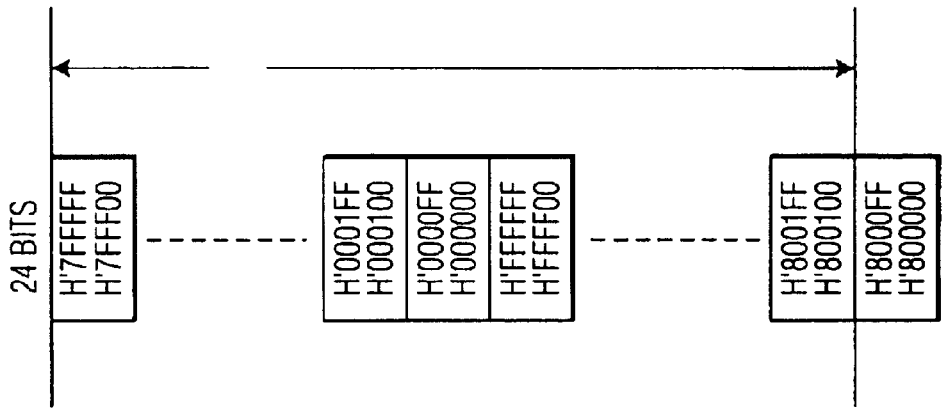
FIGS. 11a and 11b are diagrams for explaining the code assignment of audio signal and inhibiting words in the embodiment in FIG. 4.
Figure 11A:
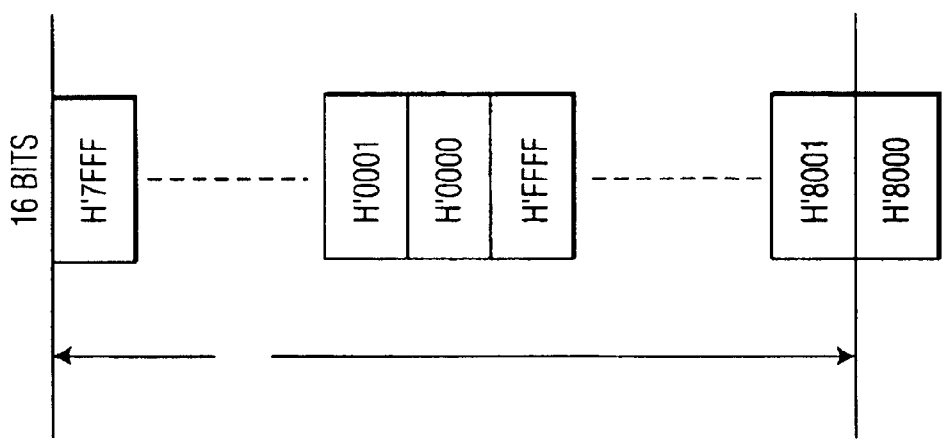

FIG. 11a shows code assignment of 16 bits standard audio data, and FIG. 11b shows code assignment of 24 bits high quality audio data. As shown in FIG. 11a, a possible quantizing value of 16 bits standard audio data, for example, the center value of H'0000 to H'FFFF is quantified into H'0000 in four hexadecimal notations. By encoding the value in every H'7FFF with complement of 2 around this center value, the maximum amplitude of the audio data is H'7FFF and the minimum value is H'8000. Herein, supposing H'8000 to be an inhibiting word, when H'8000 appears by encoding, H'8000 is replaced by H'8001. As shown in FIG. 11b, the center value of the possible quantizing value of 24 bits high quality audio data is quantified to H'000000. By encoding the value in every H'7FFFFF with complement of 2 around this center value, the maximum amplitude of the audio data is H'7FFFFF and the minimum amplitude is H'800100. Herein, in the case of 24 bits, supposing H'800000 to H'8000FF to be inhibiting words, when H'800000–H'8000FF appear by encoding, they are replaced by H'800100.

In the case of 16 bits standard audio data, the word converter 120 checks each relative position of the quantized values H'0000–H'FFFF to the center value and the converts it into a code assigned at the relative position.

First bus data forming section 121 forms a first bus data from input audio data and video data. A second bus data forming section 122 forms a second bus data from input audio data and video data. Herein, when the audio signal is 16 bits standard audio signal, the first bus data forming section 121 and second bus data forming section 122 process 16 bits standard audio data. When the audio signal is 24 bits high quality data, the first bus data forming section processes upper 16 bits of 24 bits high quality audio signal, and the second bus data forming section 122 processes its remaining lower 8 bits.

In this case, as in the first bus data forming section 121 and second bus data forming section 122, the form of the basic data and processing method are same as those in the first embodiment, so the explanation is omitted here.

An ECC adding section 123 adds ECC to the basic data of the first and the second bus. In this case, Reed-Solomon code used, for example, as the ECC, for digital audio processing. Transmitter 124 modulates the data from the ECC adding section 123, and sends it out to a transmission path 125. The transmission path 125 transmits the data modulated by the transmitting means 124.

At the reception side, receiver 126 equalizes the waveform of the data of the first and second data bus received from the transmission path 125, and demodulates the data. Error corrector 127 corrects the data error of the first and second data buses from the receiver 126. In addition, the error corrector 127 generates an error flag showing the position of the word in which some error has not been corrected. The error flag is set by one bit in each word of the data in each basic data. The error corrector 127 set the error flag to "0" when the error is normally corrected, and sets the error flag to "1" when to the error has not corrected.

First error code adding section 128 replaces error data with inhibiting words if there are any error data. Second error code adding section 129 replaces another error data with inhibiting words if there are any error data. The detail is explained below. The signal of the first data bus of the error corrector 127 is transmitted to the first error code adding section 128. The signal of the second data bus is transmitted to the second error code adding section 129. The error flags are added in each word. The first error flag corresponding to the data of one word added in the first error code adding section 128 which corrects the error of the data of one word entered from the error corrector 127 according to the value of the first error flag. The second error flag corresponding to the data of one word added in the second error code adding section 129 which corrects the error of the data of one word entered from the error correcting means 127 according to the value of the second error flag.

Hereinafter, the operation of the first error code adding section 128 and the second error code adding section 129 are explained about the 16 bits audio and the 24 bits audio, separately.

In the case of 16 bits audio, supposing "1" is set in the first error flag, the first error code adding section 128 judges there is an error in the input data of one 16 bits word, it generates an inhibiting word H'8000 shown in FIG. 11, and when the error flag "0" is set, it judges there is no error, and it sends the input data out directly.

Similarly, if "1" is set in the second error flag, the second error code adding section 129 judges there is an error in the input data of one 16 bits word and an inhibiting word H'8000, and when the error flag "0" is set, it judges there is no error, and it sends the input data out directly.

In the case of 24 bits mode, supposing the first error flag is "1", the first error code adding section 128 judges that there is an error in the input data of one word and 16 bits, it replaces the word having error with a inhibiting word H'8000 which is generated at its output. When the first error flag is "0" the first error code adding section 128 judges that there is no error, then it sends the input data out, as it is, at its output. The operation of the second error adding section 129 in cooperation with the second error flag is the same as that of the first error code adding section 128 and the first error flag, therefore, the explanation of them is omitted here. In the case of 24 bits, if the output data of the first error code adding section 128 is an inhibiting code H'8000, this inhibiting code is placed at the upper 16 bits position and is placed at the upper 8 bits position of output from the second error code adding section 129, so that the inhibited codes H'800000–H'8000FF for 24 bits audio are generated as shown in FIG. 11b.

Decoders 130 and 131 decode input data by processing reverse of encoding process of the first and the second bus data forming sections 121 and 122, respectively. The first decoder 130 restores the output of the first error code adding section 128 to the original data. The second decoder 131 restores the output of the second error code adding section 129 to the original data. Herein, if an entered word data is the inhibiting code H'8000, the first decoder 130 or the second decoder 131 interpolate by replacing the entered word data having error with a mean value of two adjacent data. For example, when the data is the inhibiting code H'8000, and when a preceding data is H'0000 and a succeeding data is H'0002, the data is interpolated by replacing with the mean of the adjacent data, that is, H'0001=(H'0000+H'0002)/2.

Audio synthesizer 132 synthesizes 16 bits or 24 bits audio signal by the combined outputs of the first and the second decoders 130 and 131. In the case of 16 bits mode, the audio synthesizer 132 directly generates the 16 bits standard audio data output data, as it is, from the first and the second decoder. In the case of 24 bits mode, the audio synthesizer 132 synthesizes and generates 24 bits high quality audio signal in combination of the upper 16 (L) bits data from the first decoder and the lower 8 (M) bits from the second decoder eliminating 8 bits dummy data.

According to the embodiment, because the inhibiting word of 16 bits mode is H'8000, and because the upper 16 bits of inhibiting word of 24 bits in high quality mode is also H'8000, then the audio synthesizer 132 can is can synthesize at least the complete 16 bits audio data out of the 24 bits audio signal, using only the data from the first decoder 130. Therefore, upon receiving the audio data of unknown mode, the synthesizer 132 can synthesize at least 16 bits complete audio data without any complicated process.

In this embodiment of the invention, the 16 bits inhibit word is H'8000, and 24 bit inhibiting words are H'800000 to H'8000FF, but not limited to these examples so long as the 16 bits inhibiting word coincides with the upper 16 bits of the 24 bits inhibiting word.

In the word converter 120, an inhibiting word is replaced by its adjacent code word, so that coding error can be minimized, but it is not limited to that.

Reed-Solomon code is added as the ECC in foregoing example, but not limited to this, and any other ECC may be used.

Further, the first error code adding section 130 corrects the error depending on the first error flag, and also the second error flag may be also used at the same time so that it corrects the error depending on both of the first and second error flags.

(Embodiment 6)

Figure 5:
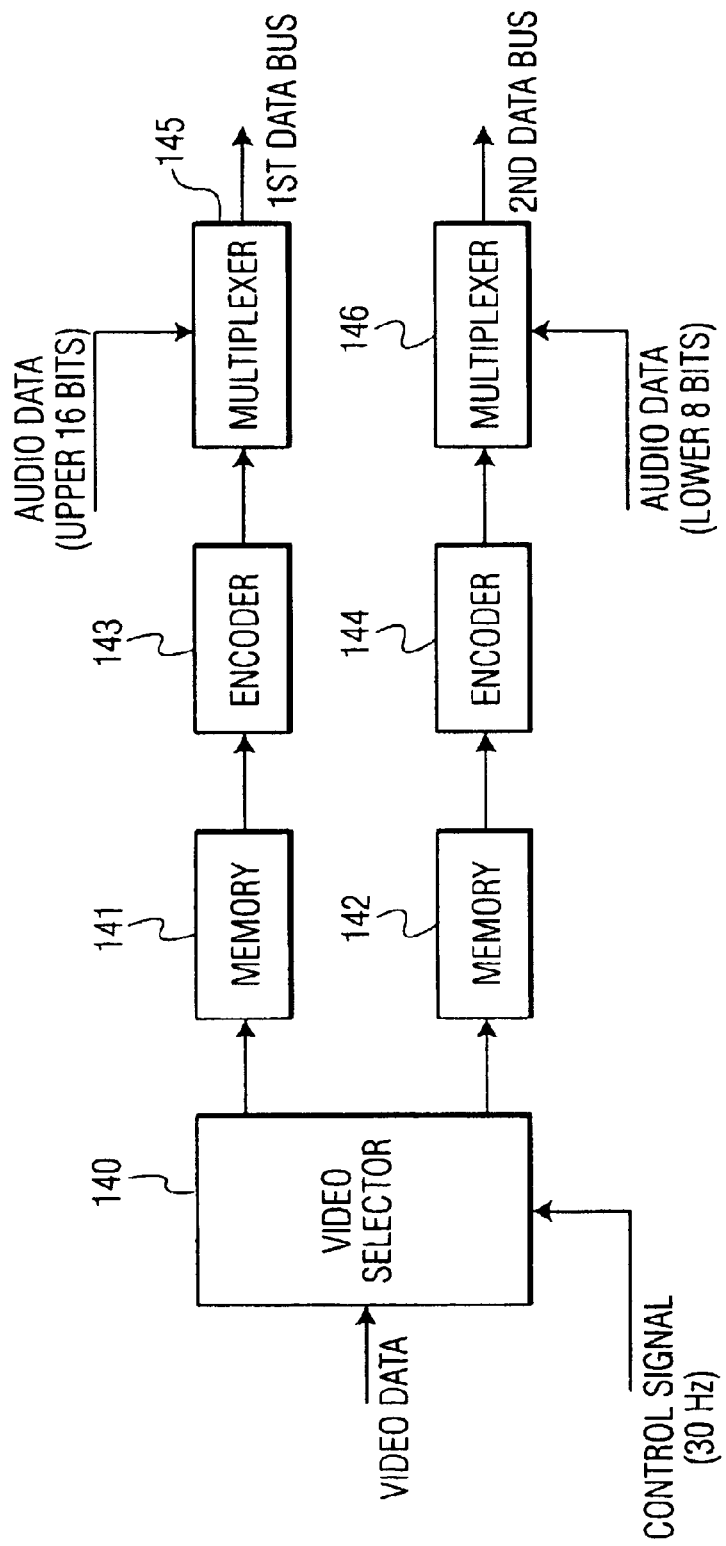
FIG. 5 is a block diagram of a further embodiment of the invention.

FIG. 5 is a block diagram of an apparatus for realizing the digital signal processing method in a different embodiment of the invention. In this embodiment, the high quality audio signal mode is realized, and video data is distributed into first data bus and second data bus in each screen. For example, the input video data is a signal has 720 scanning lines per screen and 60 screens/second, that is, a progressive image of 720/60P, and this video data is distributed alternately in first basic data and second basic data in every screen (60 Hz). In FIG. 5, a video selector 140 writes the entered 720/60P progressive video data by alternatively to a first memory 141 and a second memory 142 in every 60 Hz.

Encoders 143 and 144 encode the video data of the first memory 141 and the second memory 142 in every 30 Hz. A multiplexer 145 multiplexes the encoded, in other words bit rate reduced, video data of the encoder 143 together with the upper 16 bits of the 24 bits high quality audio signal, by means of time divisional multiplexing method. Multiplexer 146 multiplexes the encoded video data of the encoder 144 together with the lower 8 bits of the 24 bits high quality audio signal, by means of time divisional multiplexing method.

The first memory 141 and second memory 142 are composed of two memories 10 and 11, as well as 20 and 21, respectively. These two memories are controlled, to be in writing phase and in reading phase, alternately in every $\frac{1}{30}$ second. The first memory 141 memorizes video data when the clock signal of 30 Hz is logic "1". The second memory 142 memorizes video data when the control signal of 30 Hz is logic "0". These progressive scan video data are controlled and encoded such manner and timing as shown in FIG. 12.

FIG. 12 is a timing chart of memory control in the embodiment of invention shown in FIG. 5. Referring to FIG. 12, the operation of the first memory and the second memory is explained in detail. FIG. 12a shows a control signal of 30 Hz. As shown in the diagram, the control signal of 30 Hz changes over the logic value to "1" and "0" alternately in every $\frac{1}{60}$ second, and controls the video selector 140. This control signal also controls the first memory 141 and second memory 142 depending on the timing of input video data. The first memory is composed of two memory devices 10 and 11. The second memory 142 is composed of two memory devices 20 and 21.

Figure 12A:
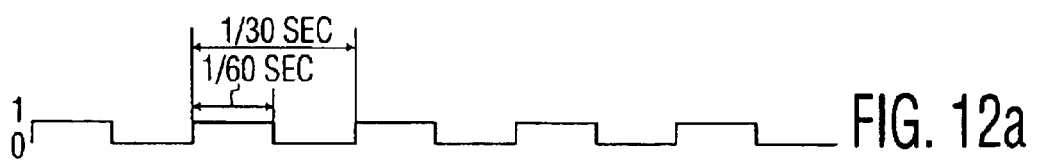
FIG. 12 is a timing chart of memory control in the embodiment of FIG. 5.
Figure 12B:
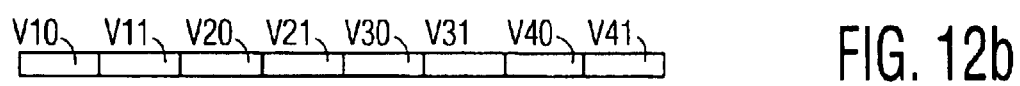

FIG. 12b shows a progressive scanning video data of input in the selector 140. As shown in FIG. 12a and FIG. 12b, since the progressive video data of 720/60P is composed by one screen in every $\frac{1}{60}$ second, two screens are formed in every $\frac{1}{30}$ second. When the control signal of FIG. 12a is logic "1", even number frame video data V10, V20, V30, and V40 are obtained. When the control signal of FIG. 12a is logic "0", odd-number frame video data V11, V21, V31, and V41 are obtained.

FIG. 12c, FIG. 12d, FIG. 12i, and FIG. 12j respectively show writing control signals 10W, 11W, 21W, and 22W, which write video data V10, V20, V11 and V21, and video data V30, V40, V31 and V41, at the timing of logic "0", on the memories 10, 11, 20, and 21, respectively. FIG. 12e, FIG. 12g, FIG. 12k, and FIG. 12m respectively show video data reading control signals 10R, 11R, 21R, and 22R, which read memorized video data V10, V20, V11 and V21, and video data V30, V40, V31 and V41, at the timing of logic "0", from memories 10, 11, 20, and 21. FIG. 12f, FIG. 12h, FIG. 12l, and FIG. 12n show by square regions which are video data read out from the memories 10, 11, 20 and 21 by reading signal 10R, 11R, 20R and 21R, respectively.

Figure 12C:
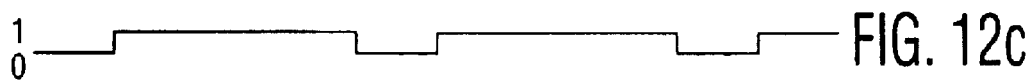
Figure 12D:
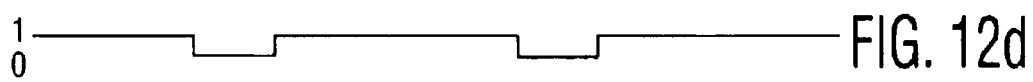
Figure 12E:
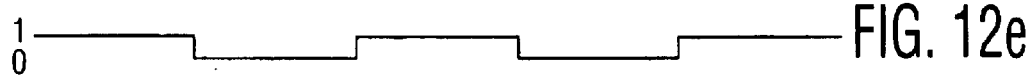
Figure 12F:
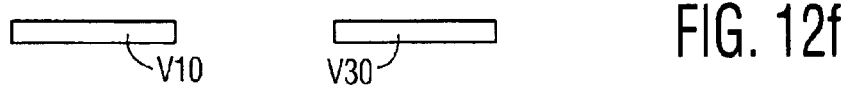
Figure 12G:
Figure 12H:
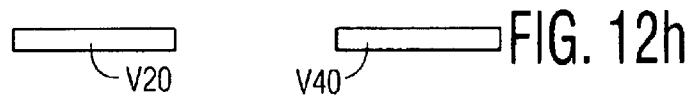

Those video data of even frames V10, V30 and V20, V40 of FIG. 12b are written on the memories 10 and 11 at the timing of logic "0" of the memory write signal of FIG. 12c and of FIG. 12d, respectively. The memorized signals are read out from memories 10 and 11 during the logic "0" of the reading signal of FIG. 12e and of FIG. 12g, so that read out video data V10 and V30 of FIG. 12f and video data V20 and V40 are extended in time axis twice ($\frac{1}{30}$ second) as long as original video data V10 and V30 ($\frac{1}{60}$ second) of FIG. 12b and original video data V20 and V40, and are delayed $\frac{1}{30}$ second from original video data.

Figure 12I:
Figure 12J:
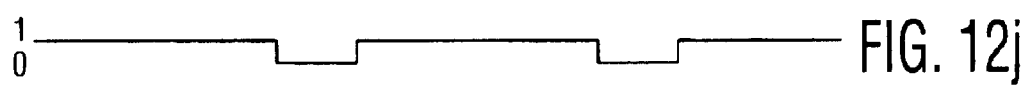
Figure 12K:
Figure 12L:
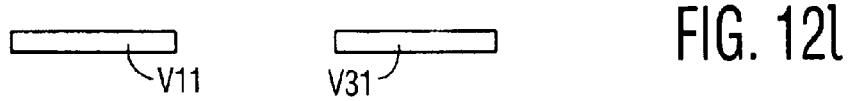
Figure 12M:
Figure 12N:
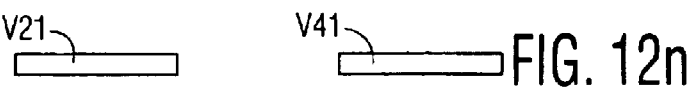

Other video data of odd frames V11 and V31 of FIG. 12b and V21 and V41 are written on the memories 10 and 11 at the timing of logic "0" of the memory write signal of FIG. 12i and of FIG. 12j. The memorized signals are read out from memories 10 and 11 during the logic "0" of the reading signal of FIG. 12k and of FIG. 12m, so that read out video data V11 and V31 of FIG. 12f and read out video data of V21 and V41 are extended in time axis twice ($\frac{1}{30}$ second) as long as original video data V10 and V30 ($\frac{1}{60}$ second) of FIG. 12b, and are delayed $\frac{1}{30}$ second from original video data.

Next, back to the FIG. 5, the operation of the encoder 143 and 144, and multiplexer 145 and 146 is explained in detail. The encoder 143 encodes even frame video data read out alternately from the memories 10 and 11 in the first memory 141 in every $\frac{1}{30}$ second by high efficiency coding so as to generate bit rate reduced data. The encoder 144, similarly, encodes odd frame video data read out alternately from the memories 20 and 21 in the second memory 142 in every $\frac{1}{30}$ second by high efficiency coding so as to generate bit rate reduced video data.

Upper 16 bits of 24 bits high quality audio signal are shuffled in every $\frac{1}{30}$ second, and sent to the multiplexer 145 together with the even frame encoded video data produced from the encoder 143. The multiplexer 145 multiplexes these video data and upper 16 bits of audio signal by use of time divisional multiplexing method, and form basic data 1 and 2, and then send them to the first bus.

The encoder 144, similarly, encodes odd frame video data read out alternately from the memories 20 and 21 in the second memory 142 in every $\frac{1}{30}$ second by high efficiency coding so as to generate bit reduced video data. Lower 8 bits of 24 bits high quality audio signal are shuffled in every $\frac{1}{30}$ second, and sent to the multiplexer 146 together with the encoded video data from the encoder 144. The multiplexer 146 multiplexes the odd frame video data and the lower 8 bits of audio signal by use of time divisional multiplexing method, and form the basic data 3 and 4, and then send them to the second data bus.

FIG. 13 is a timing chart of input and output data in the configuration of the invention shown in FIG. 5.

Figure 13A:
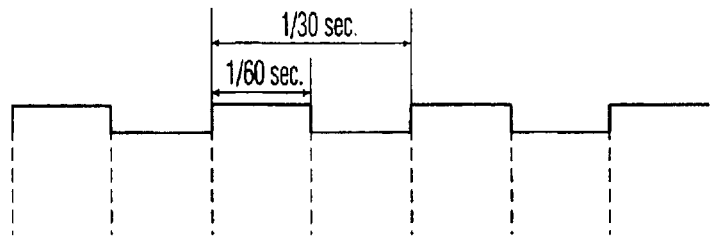
FIG. 13 is a timing chart of input and output signals in the embodiment of FIG. 5.
Figure 13B:
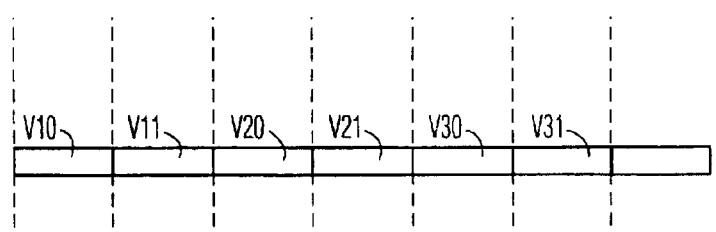
Figure 13C:
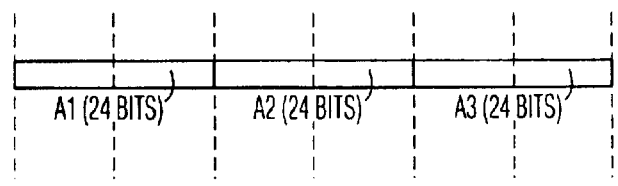
Figure 13D:
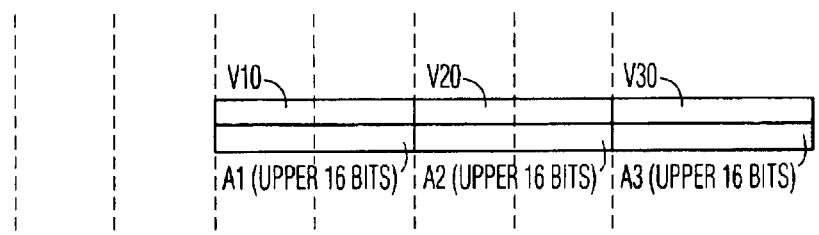
Figure 13E:
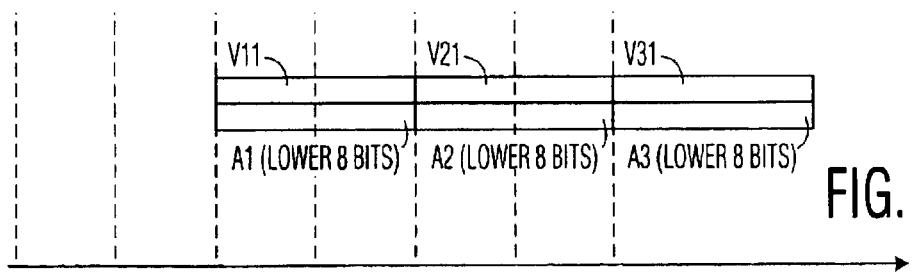

FIG. 13a shows the timing of control signal of 30 Hz. FIG. 13b shows the timing of an input video data. FIG. 13c shows the timing of an input audio signal. FIG. 13d shows the timing of basic data 1 or 2 of the first data bus received from the multiplexer 145. FIG. 13e shows the timing of basic data 3 or 4 of the second data bus received from the multiplexer 146.

As shown in FIG. 13b, the video data is sent in every $\frac{1}{60}$ second. Hence, as seen in the unit of $\frac{1}{30}$ second, video data of two screens are sent, such as V10 and V11, V20 and V21, or V30 and V31. The audio data A1, A2, and A3 of FIG. 13c is sent in every $\frac{1}{30}$ second, Video data of even frames indicated as V10, V20, and V30 are extended in time domain twice as long as input one, and multiplexed together with the upper 16 bits of 24 bits audio signals A1, A2, and A3, respectively, by use of time divisional multiplexing method as shown in FIG. 13d, and they are transmitted by the first data bus. Video data of odd frames indicated as V11, V21, and V31 are extended in time domain twice as long as input one, and multiplexed together with lower 8 bits of 24 bits audio signals A1, A2, and A3, respectively, by use of time divisional multiplexing method as shown in FIG. 13e, and they are transmitted by the second data bus.

According to the embodiment, the progressive video data 720/60P having 720 scanning lines per screen and 60 screens/sec is encoded in the bit rate reduced form in every screen (every 1/60 second). Even frames of encoded video data are multiplexed together with the upper 16 bits of 24 bits high quality audio signal by use of time divisional multiplexing method in every 1/30 second, and transmitted by the first data bus. Odd frames of encoded video data are multiplexed together with the lower 8 bits of audio signal by use of time divisional multiplexing method in every 1/30 second, and transmitted by the second data bus. Therefore, at the decoder side, for example, even when the data of the first data bus only is decoded, video data of 720/30P and 16 bits digital audio data are obtained. Moreover, by decoding the data of the first data bus and the data of the second data bus, the video data of 720/60P and 24 bits high quality audio data are obtained.

Thus, the invention can transmit and receive video data and audio data in hierarchy depending on capacity of the transmission path and of receiving side.

In this embodiment, the audio data is 24 bits, and upper 16 bits are multiplexed on the first data bus, and lower 8 bits are multiplexed on the second data bus, but when, for example, 16 bits audio data Ch1 and Ch2 are multiplexed on the audio data of the first data bus, and 8 bits audio data Ch3 and Ch4 are multiplexed on the audio data of the second data bus, and by decoding the data of the first data bus only, video data of 720/30P and 16 bits audio data Ch1 and Ch2 are obtained.

Also in the embodiment, each of the memory 141 and memory 142 are composed of two memories, but not limited to this structure, one memory may be divided into two logical spaces, and the data may be written into each logical space in every 30 Hz.

As explained in the embodiment, the progressive video data of 720/60P is transmitted in hierarchy, but not limited to this, the same is applied in the video data of other video signal system.

(Embodiment 7)

Figure 6:
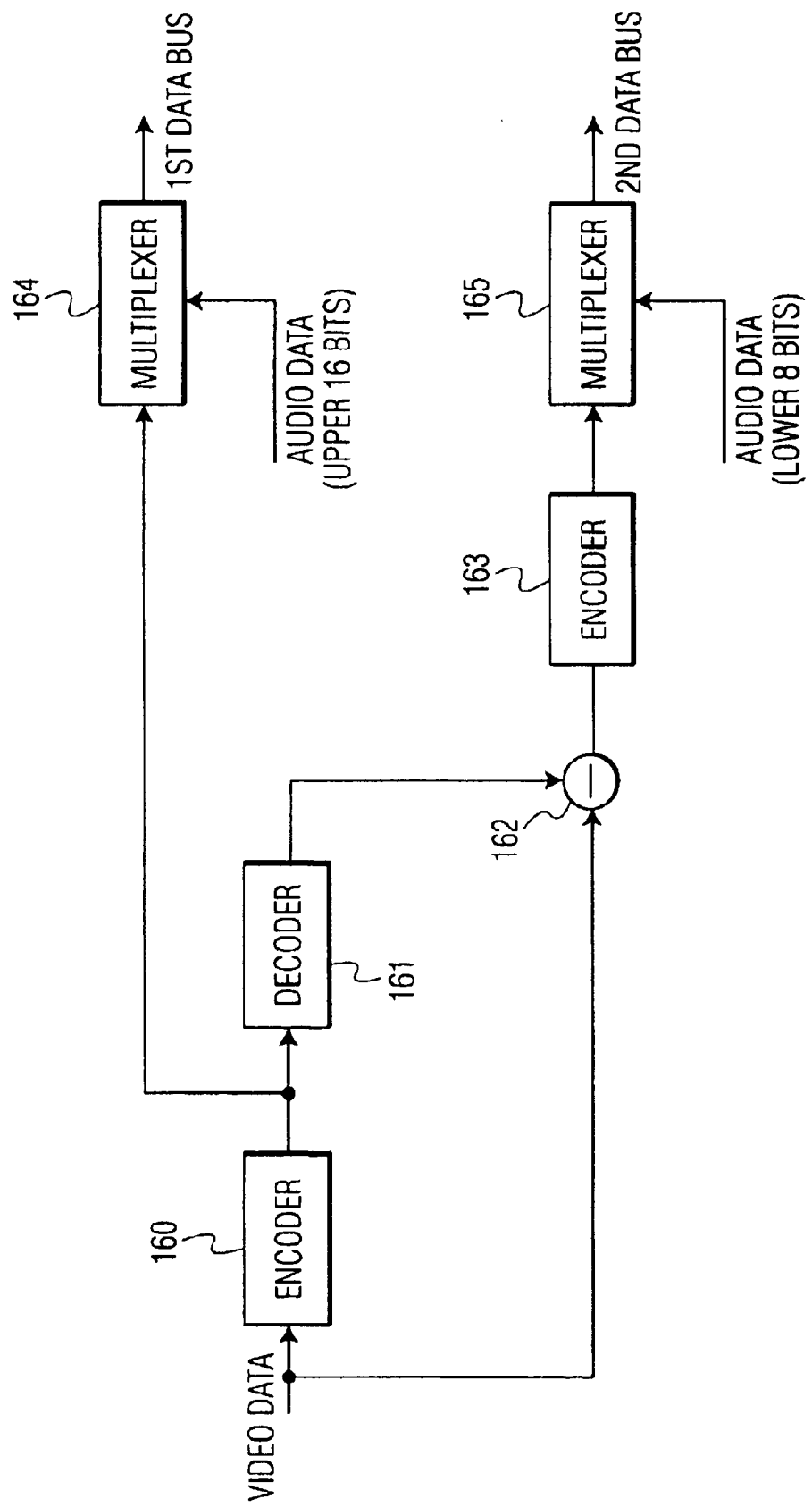
FIG. 6 is a block diagram of a still further different embodiment of the invention.
Figure 7:
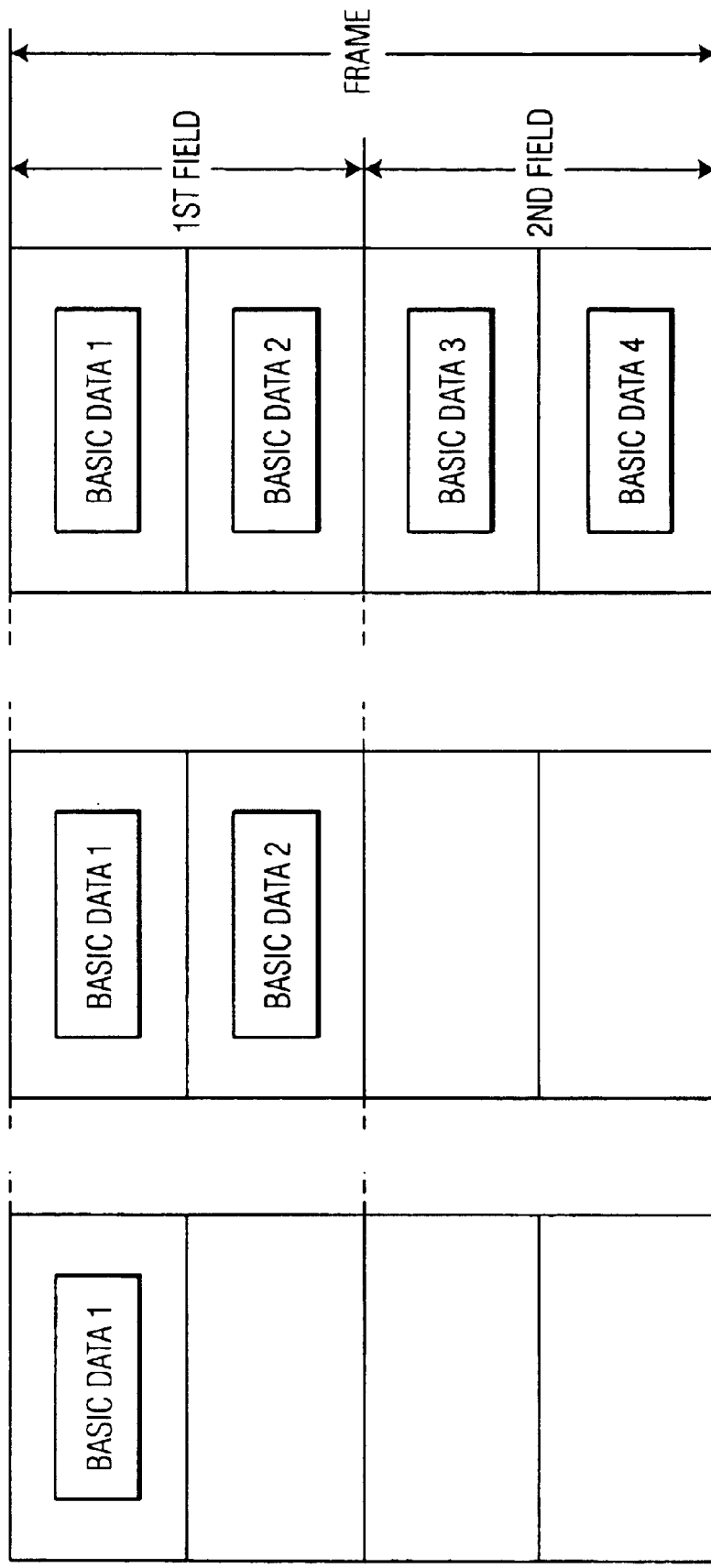
FIGS. 7a, 7b and 7c are schematic diagrams of SDTI standard.

FIG. 6 is a block diagram of another different embodiment of the invention. In this embodiment, while the audio data is realized in high quality audio mode, the hierarchically coded video data is arranged in the basic data in the first embodiment. In FIG. 6, high definition (HD) video data of frequency band of 30 MHz is entered, and frequency components of 15 MHz band or less are multiplexed together with upper 16 bits of 24 bits high quality audio signal, and transmitted by the first data bus. Frequency components of 15 MHz band or more are multiplexed together with lower 8 bits of 24 bits audio signal and transmitted in second data bus.

First encoder 160 limits the band width of high quality HD video data of 30 MHz to 15 MHz by means of a digital low pass filter, and encodes to a bit rate reduced video data, for example, of 25 Mbps by DCT, Huffman code or the like.

A decoder 161 decodes the encoded video data to the original video data from the first encoder 160.

A subtractor 162 calculates the difference of the original video data of frequency band 30 and video data of frequency band 15 MHz issued from the decoder. Second encoder 163 encodes the difference data to bit rate reduced video data, for example, of 25 Mbps. Herein, the second encoder 163 may be composed of same one as the first encoder 160, or be different one such as the DPCM or the like.

Multiplexer 164 multiplexes the video data from the first encoder 160 together with the upper 16 bits of 24 bits audio signal, and then transmits the encoded data in the first data bus. Multiplexer 165 multiplexes the encoded video data from the second encoder 163 together with the lower 8 bits of 24 bits audio signal, and transmits the encoded data in the second data bus.

According to the embodiment, entering the frequency component of frequency band of 15 MHz reduced in frequency band from HD signal of frequency band of 30 MHz or less and the upper 16 bits of 24 bits audio signal are transmitted by the first data bus, and the frequency component more than 15 MHz and the lower 8 bits of 24 bits audio signal are transmitted by the second data bus. Consequently, for example, by decoding only the first data bus at the decoder side, the video data of frequency band of 15 MHz and 16 bits audio signal can be obtained. Moreover, by decoding both the first data bus and second data bus, the HD video data of frequency band of 30 MHz and 24 bits high quality audio signal can be obtained.

Therefore, the video data and audio data can be transmitted in hierarchy depending on capacity of the transmission path and decoder side.

In this embodiment, the audio signal is 24 bits, and upper 16 bits are multiplexed on the first data bus, and lower 8 bits are multiplexed on the second data bus. When, for example, 16 bits audio data Ch1 and Ch2 are multiplexed on the first data bus, and 16 bits audio data Ch3 and Ch4 are multiplexed on the second data bus, by decoding the first data bus only, video data of 15 MHz band and 16 bits audio data Ch1 and Ch2 are obtained.

In the embodiment, the HD signal is transmitted in hierarchy but not limited to this, it is similarly realized in the digital video data of other signal system.

As explained herein, when multiplexing audio data on the fixed length video data, the invention can be applied to both standard multi-channel audio and high quality audio. Further by the mixed mode of standard audio and high quality audio, audio data having two kinds of bits number can be transmitted and received in one system.

In the case of high quality mode and mixed mode, when only the first data bus is decoded, the compatibility with the standard multi-channel audio mode can be established.

Moreover, by using ID code and/or position code, if the audio signal mode is changed by editing or the like, the audio data can be decoded by using inhibiting words, the any transmission error can be recovered.

Still more, by placing independent video data and audio data of high quality mode in the first data bus and second data bus, the video data and audio data can be transmitted and received in hierarchy while keeping compatibility with the conventional encoded digital bus.

What is claimed is:

1. A digital signal processing method comprising the steps of:
   (a) composing, from digital video data, a plurality of first encoded video data and a plurality of second encoded video data, wherein a number of the first encoded video data is "N" ("N" being a natural number), and the second encoded video data is "N";
   (b) dividing, each of N×K channels ("K" being a natural number) of high quality quantized by M bits ("M"

being a natural number) into audio data of upper "L" ("L" being a natural number) bits from most significant bit and audio data of lower M-L bits from least significant bit, wherein "L" is a quantized bits of standard audio data, and "M" is larger than "L" and no larger than twice of "L" (that is, L<M≦2×L);

(c) composing a plurality of first basic data and a plurality of second basic data, wherein number of the first basic data is "N", and the first basic data have respective K channels audio data of upper "L" bits multiplexed together with each of the first encoded video data, and wherein number of the second basic data is "N", and the second basic data have respective K channels audio data of audio data of lower M-L bits multiplexed together with each of the second encoded video data;

(d) transmitting said plurality of the first basic data in a first data bus; and (e) transmitting said plurality of the second basic data in a second data bus.

2. A digital signal processing method comprising the steps of:

(a) composing, from digital video data, a plurality of first encoded video data and a plurality of second encoded video data, wherein a number of the first encoded video data is 2×N ("N" being an even number), and the second encoded video data is 2×N;

(b) dividing, each of N/2×K channels ("K" being a natural number) of high quality quantized by M bits ("M" being a natural number) into audio data of upper L ("L" being a natural number) bits from most significant bit and audio data of lower M-L bits from least significant bit, wherein "L" is a quantized bits of standard audio data, and "M" is larger than "L" and no larger than twice of "L" (that is, L<M≦2×L);

(c) forming a plurality of first basic data and a plurality of second basic data, wherein a number of the first basic data is "N", N/2 data of the first basic data have respective K channels high quality audio data of upper L bits multiplexed together with each of N/2 data of the first encoded video data, and remaining N/2 data of the first basic data have respective K channels L bits standard audio data multiplexed together with each of remaining N/2 data of the first encoded video data, and, wherein number of the second basic data is "N", N/2 data of the second basic data have respective K channels audio data of audio data of lower M-L bits multiplexed together with each of N/2 data of the second encoded video data, and remaining N/2 data of the second basic data have respective K channels L bits standard audio data multiplexed together with each of remaining N/2 data of the second encoded video data, and;

(d) transmitting said plurality of the first basic data in a first data bus; and (e) transmitting said plurality of the second basic data in a second data bus.

3. The digital signal processing method of claim 1 or 2, further comprising the steps of:

providing each first basic data with a first ID code, said first ID code showing whether audio data of corresponding lower M-L bits is existing or not; and providing each second basic data with a second ID code, said second ID code showing whether audio data of corresponding lower M-L bits is existing or not.

4. The digital signal processing method of claim 3, wherein M bits high quality audio data is decoded when the first ID code shows existence of audio data of corresponding lower M-L bits, and the second ID code of the corresponding second basic data shows existence of the audio data of lower M-L bits.

5. The digital signal processing method of claim 4, further comprising a step of:

adding a position code to the data multiplexed with the audio data of lower M-L bits in the second basic data, said position code specifying the first basic data multiplexed with the audio data of the corresponding upper L bits.

6. The digital signal processing method of claim 1 or 2, further comprising a step of:

setting a first inhibiting word composed of L bits and a second inhibiting word composed of "M" bits of which upper L bits are same as in the first inhibiting word.

7. The digital signal processing method of claim 6, further comprising the steps of:

adding an error correction code (ECC) to each one of basic data; and replacing at least upper L bits of the audio data of M bits judged to have error by the ECC with the first inhibiting word.

8. The digital signal processing method of claim 1 or 2, wherein the first encoded video data and tthe second encoded video data are individually encoded video data to be decoded into digital video data independently.

9. The digital signal processing method of claim 1 or 2, wherein the digital video data is progressive scan video data, and the first and the second encoded video data can compose the progressive scan video data by encoding in every video frame.

10. The digital signal processing method of claim 9, wherein one of the standard audio data and the high quality audio data is audio data corresponding to two video frames data.

11. The digital signal processing method of claim 1 or 2, wherein the second encoded data is bit rate reduced data of difference of an input digital video data and decoded data of the first encoded data.

* * * * *